US006067548A

United States Patent [19]
Cheng

[11] Patent Number: 6,067,548
[45] Date of Patent: May 23, 2000

[54] DYNAMIC ORGANIZATION MODEL AND MANAGEMENT COMPUTING SYSTEM AND METHOD THEREFOR

[75] Inventor: Edward C. Cheng, South San Francisco, Calif.

[73] Assignee: e Guanxi, Inc., San Mateo, Calif.

[21] Appl. No.: 09/116,521

[22] Filed: Jul. 16, 1998

[51] Int. Cl.[7] ...... G06F 17/30
[52] U.S. Cl. ...... 707/103; 707/101; 707/104
[58] Field of Search ...... 707/104, 101, 707/103

[56] References Cited

U.S. PATENT DOCUMENTS

| | | | |
|---|---|---|---|
| 5,204,958 | 4/1993 | Cheng et al. | 707/102 |
| 5,329,626 | 7/1994 | Klein et al. | 709/248 |
| 5,864,862 | 1/1999 | Kriens et al. | 707/103 |

*Primary Examiner*—Thomas G. Black
*Assistant Examiner*—Charles L. Rones
*Attorney, Agent, or Firm*—Timothy H. Gens

[57] ABSTRACT

The present invention provides a dynamic organizational database as an underlying information system to support collaborative computing in a global enterprise. This information system is built based on the Organizational Modeling and Management model (OMM) and provides a system architecture and a graphical user interface for easy manipulation of organizational objects. Contrary to traditional approaches, the present invention separates the organization model from the process model, the application model and the data model. Thus, independent and flexible enterprise modeling and design is allowed to reflect more realistically a rapidly changing business environment.

30 Claims, 8 Drawing Sheets

DYNAMIC ORGANIZATION MODEL AND MANAGEMENT COMPUTING SYSTEM AND METHOD THEREFOR

FIELD OF THE INVENTION

The present invention relates to a organizational database used as an underlying information system to support distributed and collaborative computing in a global enterprise. More particularly, the present invention separates the organization model from the process model, the application model and the data model to provide a dynamic policy-based on organizational resources management system.

BACKGROUND OF THE INVENTION

Computer integrated manufacturing and office automation rely on process modeling and the management of business processes over a distributed and collaborative computing environment. Since business processes often involve different types of corporate resources, their underlying information system must maintain knowledge of and support access to the rapidly changing multidimensional organizational structure and resource relationship to ensure compliance with company business policies and overall system consistency and efficiency.

Business process management (BPM) implementations have historically focused on technologies around process integration, activity coordination, and concurrency control, and to some level, on individual worker productivity (Cheng, E., et. al., 1991, An Open and Extensible Event-based Transaction Manager, *Proceedings of USENIX Conference*; Cheng, E., 1995, Re-engineering and Automating Enterprise-wide Business Processes, *Proceedings of International Working Conference on Information Industry*, Bangkok, Thailand, April; Cheng, E., 1997. *The OMM Model*. Technical Report of the OCT Lab and College of Notre Dame. Belmont, Calif., November. These references are incorporated herein by reference in their entirety.) The view of the organization, and the connection between process and organizational resources, have been characterized as administrative overheads (Howard, M., 1991, Work Flow: the Coordination of Business Processes, *Gartner Group Presentation Highlights*, August). Many BPM systems simply adopt the user model of a relational database management system (RDBMS) as their organization model. However, the user model in RDBMS is designed primarily for isolated transactional operations rather than integrated process activities. The shortcoming of the user model in RDBMS is that it is not adequate to model the flexible resource relationship that is required to support a BPM system.

Other proposed BPM systems start from the process view and tightly couple the organization model with the role model and the process model for an integrated system. These workflow management systems are often workflow applications using information from existing databases to coordinate each user to work towards a common goal by processing instances of workflow types. These integrated BPM systems propose specific role models and methodologies for concurrent engineering. Task assignment rules comprise a static, rule-based methodology specifying which user executes which unit of work. Examples of integrated BPM systems which couple the organization model with the role model and the process model: Bussler, C., 1996, Analysis of the Organization Modeling capability of Workflow-Management-Systems. *PRIISM Conference*.; Di Leva, A., Giolito, P., Vernadat, F., 1997, The M*-OBJECT Organization Model for Enterprise Modeling of Integrated Engineering Environments. *Concurrent Engineering—Research and Applications*, 5(2):183–194.; Su, S. 1986, Modeling Integrated Manufacturing Data with SAM-*, *Computer,* 19(1) :34–49; (Hsu, M., 1991, An Execution Model for an Activity Management System, *Digital Technical Report*, April.; Hsu, M., Kleissner, C., 1996. Objectflow—towards a process management infrastructure, *Distributed and Parallel Databases*, 4(2): 169–194).

Apart from the integrated BPM systems discussed above, former efforts have attempted to address the organizational resource management issue through a directory service. Directory services (DS), and other naming services, aim to support distributed object lookup with a naming convention (see for example, *CCITT Recommendation X.*500 *to X.*521 (1988): *Data Communication Networks, Directory*, Blue Book. Also ISO/IEC Standards ISO 9594-1 to ISO 9594-7.). Each object on the system is assigned a static and universally unique identifier (UUID). This approach yields an efficient solution for simple point-to-point interaction in collaborative software by resolving static addresses for electronic mail, video conferencing, group scheduling and the likes. Nevertheless, DS lacks an organization model and support for dynamic relationships between resources. Consequently, DS fails to support advanced applications such as in publish-and-subscribe where the publisher is not interested in a list of static addresses but would like to identify subscribers based on some correlation between the publishing context and the up-to-date profile of potential target customers.

Overall, the existing organizational resource management approaches suffer from a variety of problems such as the lack of a conceptual organization reference model. A generic solution is needed so that the model can be applied to different concurrent engineering and collaborative computing environments. Although static, task assignment workflow applications may be sufficient for small departments or subgroups within an organization, this simplistic assignment schema is insufficient for complex workflows where responsibility depends on several factors and not only on statically-defined roles. The workflow becomes even more complex with the effective expansion of the organization through intranets and the Internet to a global scale.

Another problem is that some of the prior art organization systems are tightly integrated with the process and application models. Consequently, it is only adequate to support the BPM systems which observe the specific models.

Prior art BPM systems also support only some predefined resource types. For example, network DS focus on machine nodes, users and applications while messaging DS focus on user addresses and the BPM organization sub-components focuses on users, groups and roles. To support the collaboration between the different applications and users, the organization model must be extensible and flexible in order to be able to define resource types of different dimensions which include employees, departments, products, machines, projects, accounts, and others.

Another limitation of prior art BPM systems is that they assume only static and hardwired relationships between resources. In reality, relationships between resources are rapidly changing and the BPM system fails to change with environment it is attempting to represent. To complicate this problem, relationships exist not only among resources of the same type, but also among different types of objects. For instance, there is a many-to-many relationship between the company projects and its employees. Similarly, a three-way relationship can be defined between users, machines, and projects (who is using which machine for which project).

The lack of openness to integrate with other organizational management systems exhibited by prior art BRM systems is also a problem. There are existing directories and organizational resource information systems that run in a cooperative environment. To be truly effective, a comprehensive architecture must take consideration to exchange information with the existing solutions.

The present invention solves the need created by the aforementioned problems by providing an organizational information system which is built based on the Organization Modeling and Management (OMM) methodology of the present invention.

SUMMARY OF THE INVENTION

The dynamic organizational information system of the present invention, the underlying methodology and organization model, along with its system architecture and user interfaces are presented as a comprehensive tool to model an enterprise for collaborative computing. The present invention abstracts the organization model from the role model, thus giving flexibility in complex organization modeling. The present invention provides a unique dynamic interrelationship that is expressed by using regular expressions over member attributes and contextual variables. The relationship model is important in supporting collaborative software such as workflow, for authentication, authorization and dynamic job assignment. Using virtual links, the present invention can model dynamic roles such that policies regarding various operations over the work objects can be defined and maintained. The inventive life-cycle of the members reflects the dynamic state changes of resources in reality and makes automatic task re-routing in a workflow system possible in case a resource is absent from its duty. Organization management is better supported because the present invention does not wait for a default condition or time-out to occur. Instead, the present invention is dynamic or proactive and queries the life-cycle of the member to immediately determine availability of the resource.

The present invention supports the conceptual design and the design implementation phases of the enterprise modeling cycle. It also includes a conceptual and reference model for enterprise modeling. Furthermore, the present invention does not assume a particular process model or application model and, thus, provides a generic approach which is able to map its object types to other organizational data schemes to present an integrated multidimensional view of organizations to the user. The present invention also provides a system architecture which encompasses a programming interface for other organizational resource managers to plug-in as part of a global enterprise model. More specifically, a charting view is provided as a simple graphical user interface for users to explore the dynamic relationships between the resources. The present invention also supports role resolution in a BPM or workflow system.

The present invention provides a utility, method, and network for an organizational database to support collaborative computing between users within a computer system network by an enterprise having a plurality of objects. The utility includes means for expressing information received from at least one of the users and means for storing a plurality of classes of organizational objects. Each class contains any number of member objects of that class. The utility also includes means for mapping the member objects to the objects within the enterprise and means for virtually linking one or more member objects to at least one other member object with a relationship definition which can be dynamically evaluated and resolved at runtime of the utility. The expressing means determines which of the relationship definitions are to be evaluated and resolved. The expressing means is coupled to the storing means, mapping means, and virtually linking means.

Another utility, method, and network provided by the present invention is for integrating a plurality of preexisting databases to support collaborative computing between users within a computer system network by an enterprise having a plurality of objects. The utility includes means for defining each of the preexisting databases as an organization and means for defining each field in one of the preexisting databases to correspond to an attribute. The utility includes means for implementing each attribute with a number of preexisting database object (which term includes a table in the case of a preexisting relational database) and storing the attributes of a specific data type with each of the database objects whereby each of the database objects has a group of fields which stores one instance of an attribute of an object in the preexisting database.

The present invention provides another utility, method, and network for a preferred application area such as the security for an organizational database supporting collaborative computing between users within a computer system network by an enterprise having a plurality of objects. The utility includes means for storing at least one member object corresponding to one of the objects in the enterprise, the member object having attribute and contextual values. The utility also includes means for virtually linking the member object with a relationship definition which can be dynamically evaluated and resolved at runtime of the utility whereby access to the network is determined by the relationship definition being a pre-determined appropriate value. The storing means is coupled to the virtually linking means.

The present invention also provides a utility, method and network for an organizational database to support collaborative computing between users within a computer system network by an enterprise having a plurality of objects. The utility including means for storing a plurality of member objects which correspond to the objects within the enterprise and means for virtually linking each member object with a relationship definition which can be dynamically evaluated and resolved at runtime of the utility. The utility also including means for querying the relationship definition to resolve an expression received from at least one of the users, the querying means coupled to the storing means and virtually linking means.

Another utility, method, and network is provided for an organizational database to support collaborative computing between users within a computer system network by an enterprise having a plurality of objects. The utility including means for separating a organizational model from a process model, an application model, and a data model of the enterprise. The process model defines the control flow and coordination methods between a series of work tasks. The application model defines the interaction between a user application and the individual work task. The data model of a workflow system defines the data flow and concurrency accesses to the workflow data. The organization model defines the different organizational objects and their interrelationship.

A preferred embodiment of the present invention provides a utility, method, and network for an organizational database to support collaborative computing between users within a computer system network by an enterprise having a plurality of objects. The utility includes means for virtually linking each member object with a relationship definition which can be dynamically evaluated and resolved at runtime of the utility. The utility also includes life-cycle means for representing the availability of one or more member objects to function in response to means for querying the relationship definition to resolve an expression received from at least one of the users. The life-cycle means having a plurality states to indicate its availability to function, the life-cycle means changing from one state to another by input from one of the users. Preferably, the plurality of states includes an active state which changes to an inactive state simulating the reality of the member object being available for its function, or a removal state wherein the information of the member object is retained in the storing means (which could be a near-lined device), or a forgotten state wherein the information of the member object is archived or deleted.

Other and further advantages, embodiments, variations and the like will be apparent to those skilled-in-the-art from the present specification taken with the accompanying drawings and appended claims.

BRIEF DESCRIPTION OF THE DRAWINGS

In the drawings, which comprise a portion of this disclosure.

DETAILED DESCRIPTION OF THE INVENTION

Generally, the present invention provides a dynamic organizational information system, an underlying methodology and organization model, along with its system architecture and user interfaces as a comprehensive tool to model an enterprise for collaborative computing. The present invention abstracts the organization model from the role model, thus giving flexibility in complex organization modeling. The present invention provides a unique dynamic interrelationship that is expressed by using regular expressions over member attributes and contextual variables. The relationship model is important in supporting collaborative software such as workflow, for authentication, authorization and dynamic job assignment. Using virtual links, the present invention can model dynamic roles such that policies regarding various operations over the work objects can be defined and maintained. The inventive life-cycle of the members reflects the dynamic state changes of resources in reality. This provides better support of organization management and makes dynamic task re-routing in a workflow system possible in case a resource is absent from its duty.

More specifically, the present invention provides a workflow approach wherein process routing control is abstracted from the application logic. As a result, a flexible design and implementation of flow logic is provided without interfering the implementation of the associated applications. The flow logic concerns mainly the routing decisions through the life of a process instance.

Figure 1:
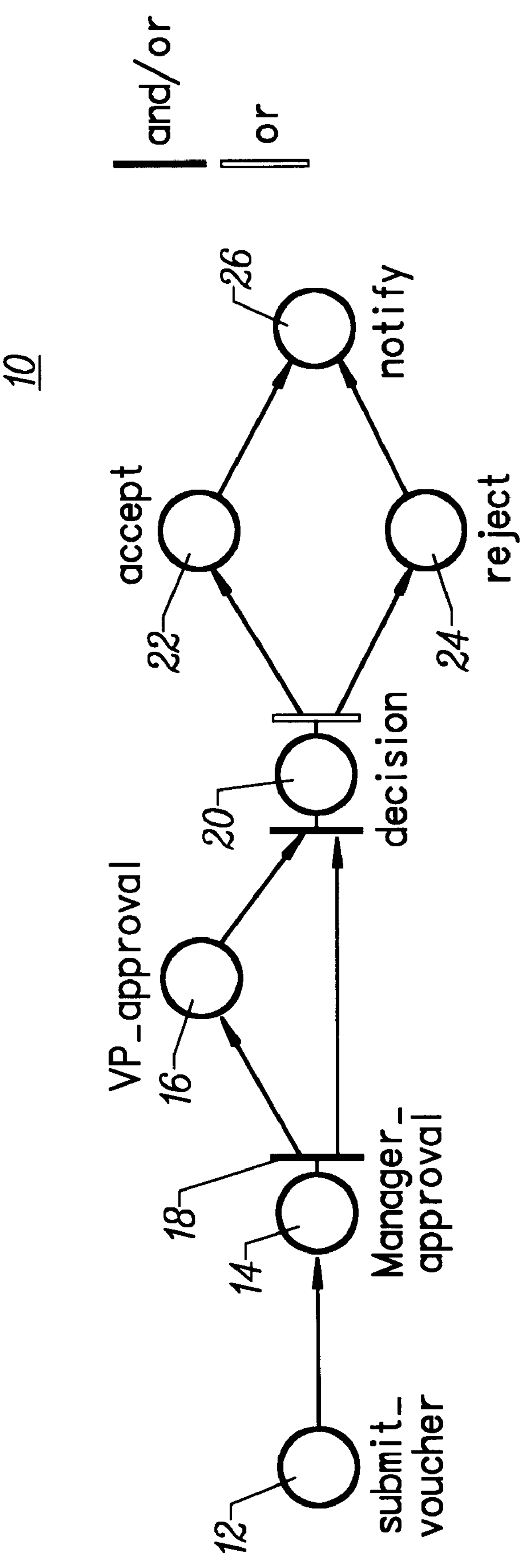
FIG. 1 illustrates an expense voucher process using an organizational model of the present invention.

For example, FIG. 1 illustrates a flow description of a simple expense voucher process 10 which involves a number of human resources. Any worker in the company can be the flow-initiator and initiate the expense voucher process 10 by executing the submit__voucher step 12. The manager__approval step 14 must be executed by the manager of the flow-initiator. Similarly, the VP__approval task 16, which is only created when the expense balance is greater than a certain amount at decision point 18, must be run by the vice president of the division to which the flow-initiator belongs. The last four steps in this example, decision 20, accept 22, reject 24, and notify 26, can be done without any human intervention. Most workflow systems support the definition of this expense voucher process 10 by allowing an administrator to define this flow map through a graphical or scripting interface. The workflow data which impact the routing decision of the flow are also defined as part of the flow definition. Agent applications associated to individual steps are connected to the workflow system through a workflow programming interface. Finally, roles are defined to control task assignment and task authorization.

Figure 2B:
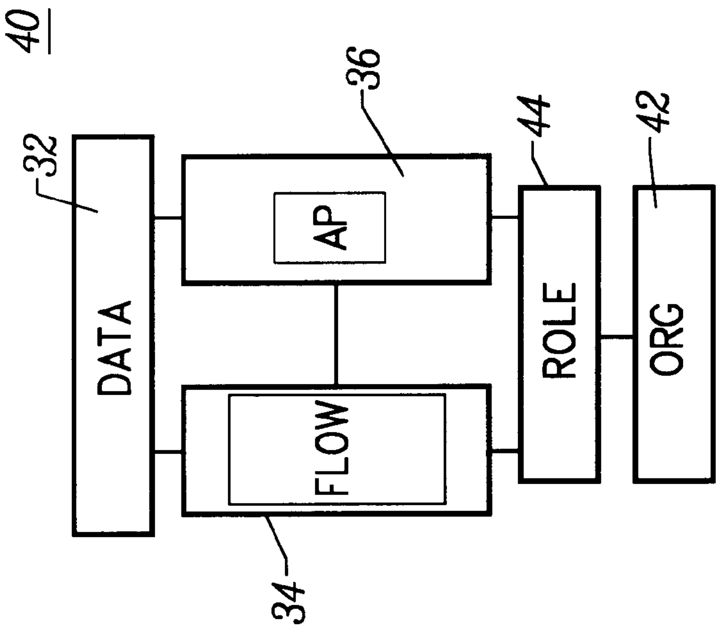
FIGS. 2A (prior art) and 2B illustrates how the present invention (2B) separates the role and organization models of the prior art (2A)
Figure 2A:
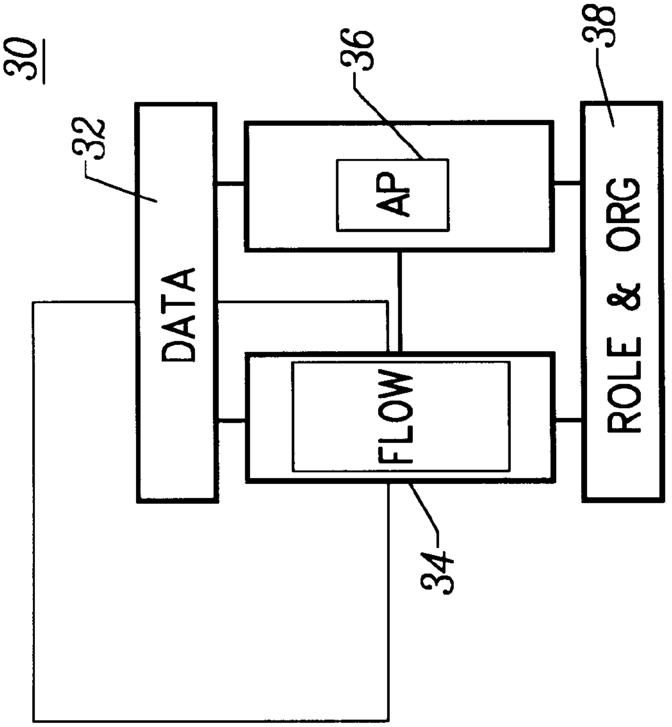

The present invention separates the organization model from the role model of the BPM system. FIGS. 2A and 2B show how the prior art and inventive models respectively differ in their interface structure. FIG. 2A represents the prior art workflow system model 30 with data 32 flowing to the business processes 34 and applications 36. The role definition and resolution is completed with the organizations 38 which are modeled in conjunction with the businesses processes and applications 36. By contrast, the system model 40 of the present invention, the organizations 42 are modeled separately from the business processes 34 and applications 36. Role definition and resolution 44 is done through the organizational modeling 42 which provides a management interface.

Figure 3:
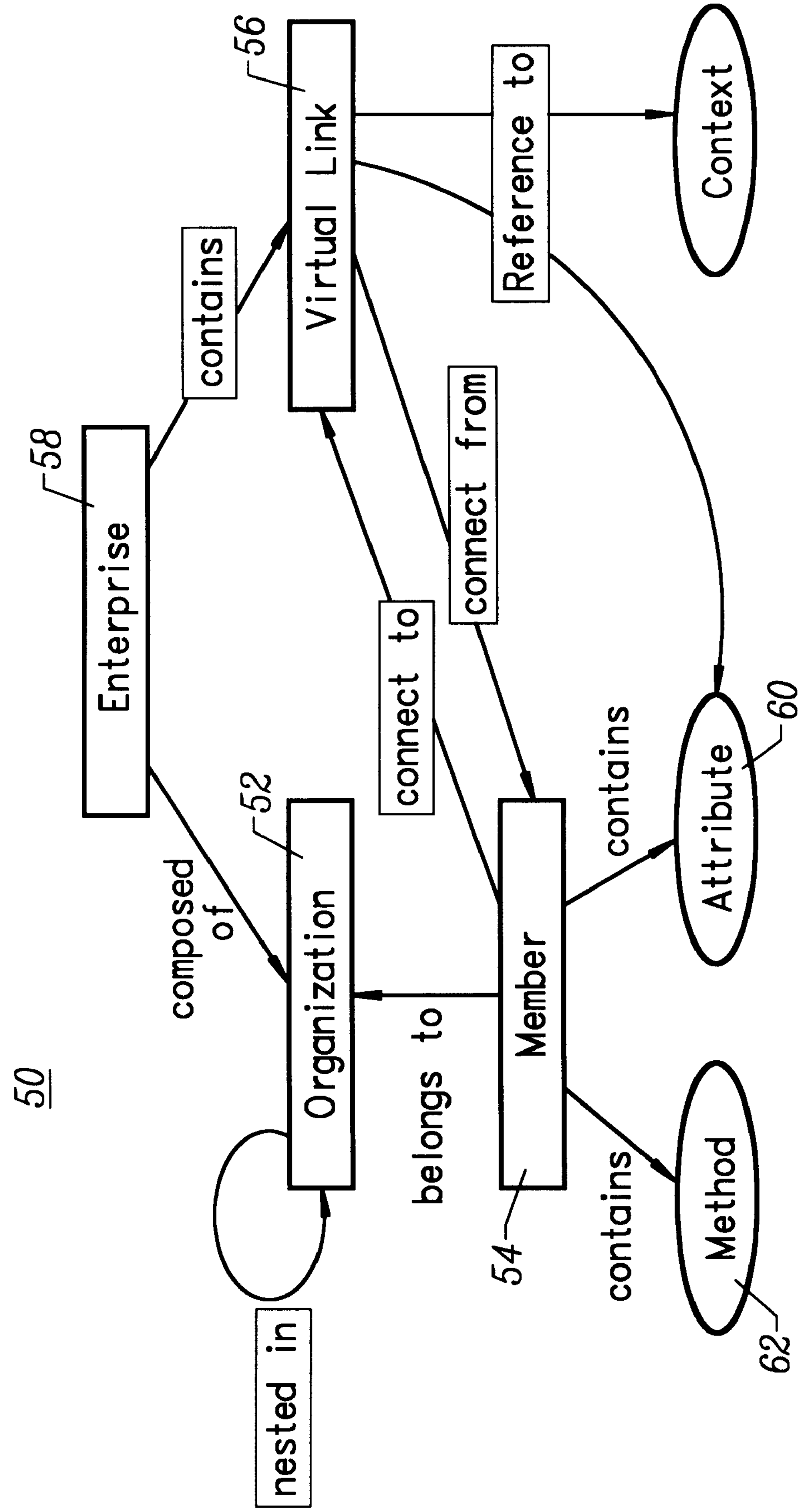
FIG. 3 is a diagram of the inventive organizational model.

The organization model 50 of the present invention illustrated in FIG. 3 is a generic reference model which can be applied flexibly to different collaborative computing environments. There are at least three components in the inventive organizational model 50, namely the organizations 52, members 54, and virtual links 56.

Generally, an enterprise 58 or corporation is composed of a number of organizations 52. As used herein, the term organization is a sub-group of the enterprise. Each one of these organizations 52 stores at least one class of members 54 which are organizational objects such as employees, departments, products or projects. Each one of the organizations 52 contains a set of members 54, each of which maps to an actual entity within the enterprise 58 or corporation. Members 54 of the same class share a common set of attributes 60 and methods 62 that is extensible by the user. Any one of the members 54 can relate or link to other members 54 through virtual links 56 which refers to attributes 60 and context 62. The context 62 provides information about the applciation environment and is defined freely as variables by the user, e.g., $day__of__week, $system__load, $inventory__of__part, $initiator__of__process, etc. The virtual link relationship can exist between members depending on the attribute 60 values and the contextual 62 values. By contrast to the static connections of the prior art BPM systems, any one of the virtual links 56 only has a relationship definition which is evaluated and resolved at runtime.

More specifically, the enterprise 58 includes at least organizations 52 which are objects created to map to the different resources and other sub-groups of the enterprise. As used herein, the term resource is defined as any object that the enterprise uses to accomplish its mission or goal. The object can be tangible or intangible, such as a department structure. Using the organizations 52, an enterprise can be partitioned both vertically and horizontally. Vertical partitioning can be applied to break the enterprise into different dimensions or resource types, such as people, machines, sales regions, etc. Horizontal partitioning can be applied to break dimensions or resources of the same type into smaller sub-groups. Each of the organizations 52 has a unique identifier across the whole enterprise 58.

Figure 4:
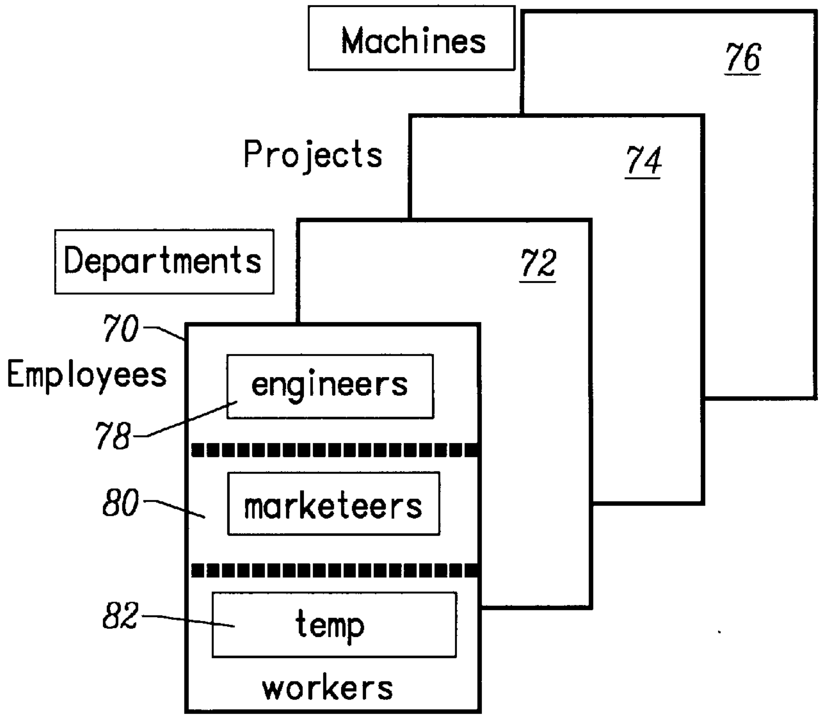
FIG. 4 illustrates the horizontal and vertical partitioning employed by the inventive organizational model.

As depicted in FIG. 4, during the organization conceptual design phase, one of the organizations 52 can be defined in multiple dimensions 70, 72, 74, and 76 to represent the employees 70 of the enterprise, the departments 72, another to represent the different projects 74, even another to represent the machines 76 or equipment, etc. The dimensions 70, 72, 74, and 76 creates a view of vertical partitioning of the enterprise 58. Each vertical partition keeps the organization information of a particular dimension 70, 72, 74, and 76.

Each of the dimensions 70, 72, 74, and 76 can further divide the organization into sub-groups 78, 80, and 82 within the same dimension horizontally. For instance, employees 70 belonging to a particular department 72 such as engineering, or namely engineers 78, can be included in one organization. Employees 70 in another department 72 such as marketing, or namely marketeers 80, are placed in another organization. Employees 70 which are not otherwise defined by a single dimension within the enterprise 58, such as temporary workers 82, can still be defined as a sub-group or resource of one particular dimension, namely employees 70. In other words, vertical partitioning helps to define the different types of dimensions 70, 72, 74, and 76 or resources within the enterprise 58, while horizontal partitioning allows users to logically divide resources of the same dimension into smaller sub-groups 78, 80, and 82.

Since different resources, and sub-groups thereof, own their individual organizational definition under the present invention, there is a much greater level of autonomy in defining and managing organizational information. Each sub-group can update, delete, or append to the organizational information, without impacting others. For major restructuring, users may alter the organization schema which corresponds to their dimension or sub-group only. In addition, the granularity of partitioning is controlled entirely by the user. Users have the flexibility to decide how fine they want to divide the organization under the present invention. When the business conditions change, they may choose to merge together or to further divide their organizations.

The present invention can utilize any type of database schema. The different vertical and horizontal partitions of the enterprise correspond naturally to database tables. It is typical to use some tables within a database environment to capture the information of an organizational partition. The present invention methodology does not dictate the underlying data model, although the preferred implementation uses either an object-oriented database or a RDBMS. When a relational database implementation is chosen, users define the attributes 60 of the members 54 as columns in a relational table. In an object-oriented database environment, the attributes 60 of the members 54 map directly to a class definition. This constitutes a class of members for each organization 52.

Figure 5:
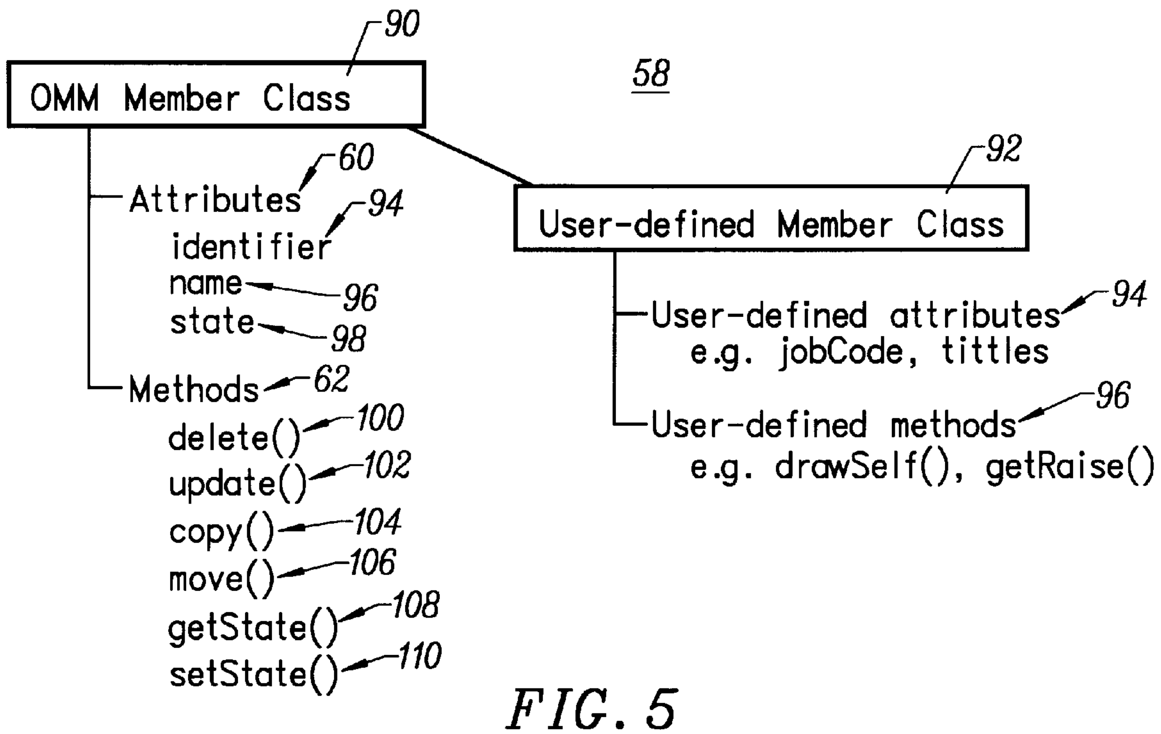
FIG. 5 illustrates the class hierarchy of a member objects used by the organizational model of the present invention.

The second component of the organizational model 50 is the members 54 which are a part of the object-orientated model that the organization uses to capture its organizational information. FIG. 5 illustrates the class hierarchy of the present invention wherein the enterprise 58 has a main member class 90 which contains a list of system-defined attributes 60 and methods 62. Examples of attributes 60 can be, but are not limited to, identifier 94, name 96 and state 98. Examples of methods of manipulating the information of the object in the member class 90 can be, but are not limited to, delete 100, update 102, copy 104, move 106, getstate 108, and setstate 110. All user-defined member classes 92 are subclasses of the main member class 90 and contain a list of the user-defined attributes 94 and user-defined methods 96. The user-defined member classes 92 inherit the properties of the main member class 90.

An identifier attribute 94 of the main member class 90 is unique for each member across the entire enterprise 58. Each object of the main member class 90 also has a name 96 that is given by the user and is unique within the entire enterprise 58. Each object of the main member class 90 also has a state 98 which transitions through a life-cycle 120 which is represented by the state transition diagram shown in FIG. 6.

When a member within a dimension like 70, 72, 74, and 76 or other resource type is created, it enters the active state 122. Thereafter the state changes are triggered by the user through a member method, setState( ) 110 as seen in FIG. 5. An object of the member class 90 can cycle between the active state 122 and an inactive state 124, simulating the reality of some dimensions or resources being suspended, off-line, or on-leave. When a member object within a dimension or resource type is removed 126, its information can still be retained in the data store 160 and be queried until it enters a forgotten state 128 which corresponds to the situation where the information of the dimension or resource type is archived away or deleted.

The present invention provides one of its unique concepts in the removal 126 of information. Even for an employee who leaves the enterprise, the information about the employee is not immediately deleted. Instead, the employee's information is archived, but is still retrievable. The fact that the present invention provides different stages gives the database the opportunity to handle the information differently than in the prior art. As the data management system understands that the employee's information is in a removed state, the information is moved from an on-line storage means to a near-line storage which has a higher storage volume. The information is still retrievable, albeit at a slower pace, from the larger volume near-line storage means.

The user-defined member class 92 for each organization is a sub-class of the main member class 90. System-defined attributes 60 and methods 62 of the main member class 90 are inherited by every user-defined member class 92. Users can define any number of attributes 60 and methods 62 for a member class. User-defined attributes 94 such as job codes, titles, etc and can be of various data types, including character string, integer, float, boolean and raw data. User-defined methods 96 can include such items as drawSelf( ), getRaise( ), etc.

With the present invention, the ownership of a user-defined member class 92 can be transferred from one organization to another. When a user-defined member class 92 is moved to another organization, some of the user-defined attributes 94 from the original organization may be mapped to the new one, and all other irrelevant information is dropped. However, the system-defined attributes 60 are always retained. This maintains the unique identity of the member even though it may be moved around the enterprise 58 from place to place.

Figure 6:
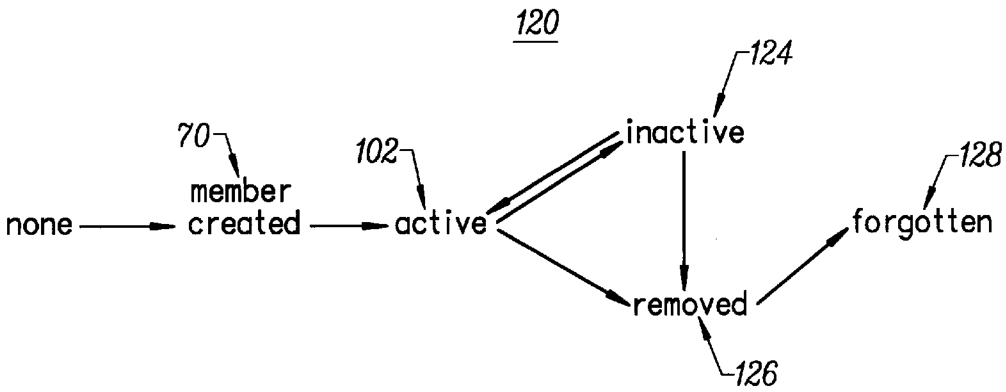
FIG. 6 illustrates state transitions of a member.

The members 52 support class inheritance, method extension, and object life-cycle. As seen in FIG. 6, the object life cycle 120 captures the dynamic behavior of a resource within an actual enterprise. The object life cycle 120 also provides allows the workflow manager or user to properly control the worklist and data of the resource sub-groups. Based on the current state of a resource sub-group, the workflow manager may choose to avoid pushing a task to a employee unless the employee is in the active state 122. The active state 122 can also be sub-divided into sub-states such as idling, busy, normal, etc.

Returning to FIGS. 3 and 4, the present invention is also unique in that members 52 can relate dynamically to one another through the third component of the organizational model 50, namely virtual links 56. Since collaborative efforts exist between company dimensions or resources, it is desirable to model relationships between those dimensions or resources. Virtual links 56 define dynamic relationships between objects of the members 52. A relationship is established from one dimension or sub-group to another, and as such it can be represented as a directed edge. If a bi-directional relationship is desired, it can be modeled as two relationships; one as a reverse relationship of the other. In this respect, resource objects are like nodes while virtual links 56 are the directed edges in a graph. A virtual link 56 is defined by the following BNF syntax (see Cheng, 1997 cited above):

```
<Virtual Link>          ::= <Owner>, <Relationship Type>, <Expression>,
                            <Organization Scope>
<Owner>                 ::= null|<Member ID>
<Relationship Type>     ::= <Relationship Name>[REVERSE<Relationship Name>]
                            [TRANSITIVE]
<Relationship Name>     ::= <Character String Constant>
<Expression>            ::= <Expression><Rel Op><Expression>|<Attribute Name>
                            <Op><Value>
<Attribute Name>        ::= <Character String Constant>
<OP>                    ::= ==|!=|>=|>|<|<=
<Value>                 ::= <Constant>|<Attribute Name>
<Rel Op>                ::= AND|OR
<Organization Scope>    ::= <Organization Name>+
<Organization Name>     ::= <Character String Constant>
```

The connection between resources is called virtual link 56 because the relationship is defined with an expression rather than a pair of static resource identification codes. Thus, the relationship may be resolved dynamically by evaluating the expression. There may be a predefined owner of a relationship, or the owner can be assigned at run time. When a user resolves a virtual link 56, the expression is evaluated over the data store, and there may have any number of resources having this relationship with the owner in question. An example of a relationship can be:

Owner: null
Relationship Name: manager_of
Expression:(owner.deptNo == X.deptNo) AND (X.jobCode < 101)
Organization Scope: employee For example, to find all the employees that are under the managerial responsibility of an executive with member 52 identification code john_smith, this virtual link 56 is resolved upon the employee 70 organization. The owner is set to 'john_smith', its attribute values 60 are retrieved and used to substitute corresponding fields in the virtual link 56 expression. Each member 52 within the employee 70 organization is evaluated against the expression. The X.attributeName is substituted with the corresponding attribute values 60 of the member 52 under evaluation.

Figure 7:
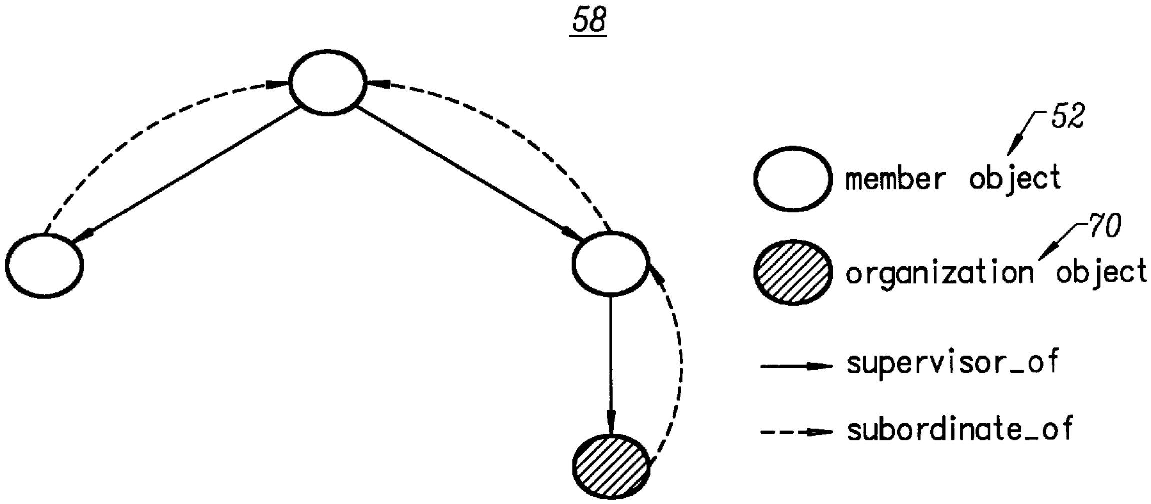
FIG. 7 is an OMM relationship graph.

Despite dynamic characteristics of relationships in the present invention, hard coded relationships between two specific entities can still be modeled with virtual links 56. To define the acting_for relationship between two employees, we have:

Owner: 'mary_ann'
Relationship Name: acting_for
Expression:(X.name == 'john_smith')
Organization Scope: employee A virtual link 56 may or may not be transitive in nature. When a transitive relationship $r_1$ is defined, and if member $m_1$ relates to member $m_2$ in $r_1$, and $m_2$ relates to $m_3$ in $r_1$, it follows that $m_1$ also relates to $m_3$ in $r_1$. There is a cost associated with resolving transitive relationships. When defining a relationship type, a reverse relationship can also be specified. For example, if relationship types $r_1$ and $r_1'$ are defined as reverse relationships to each other, and if member $m_1$ relates to $m_2$ in $r_1$, then $m_2$ relates to $m_1$ in $r_1'$. The present invention provides relationships as illustrated in FIG. 7 which shows a relationship graph within an enterprise 58 or organization. The supervisor_of and the subordinate_of in the example above are represented by reverse links to each other in FIG. 7.

Although the above example only covers relationships within an enterprise or organization, virtual links can actually be defined across multiple organizations. In this embodiment, the organization scope will list all organizations involved in the organizational model. For instance, a relationship graph may be desirable to represent the connections between a project and its machine resources and the employees who are involved in the project. In this embodiment, the owner is a particular project while the organization scope will cover both machine and employee.

A virtual link 56 illustrated in FIG. 3 can also be defined between two members 54 or be defined between a member 52 and the enterprise 58 or organization. When an object of the enterprise 58 or organization is involved in a relationship, all objects of the members 54 within that enterprise 58 or organization are involved in it. For instance, if Tom Moore is a supervisor of an organization, then all dimensions or resources within that organization are supervised by him.

Figure 8:
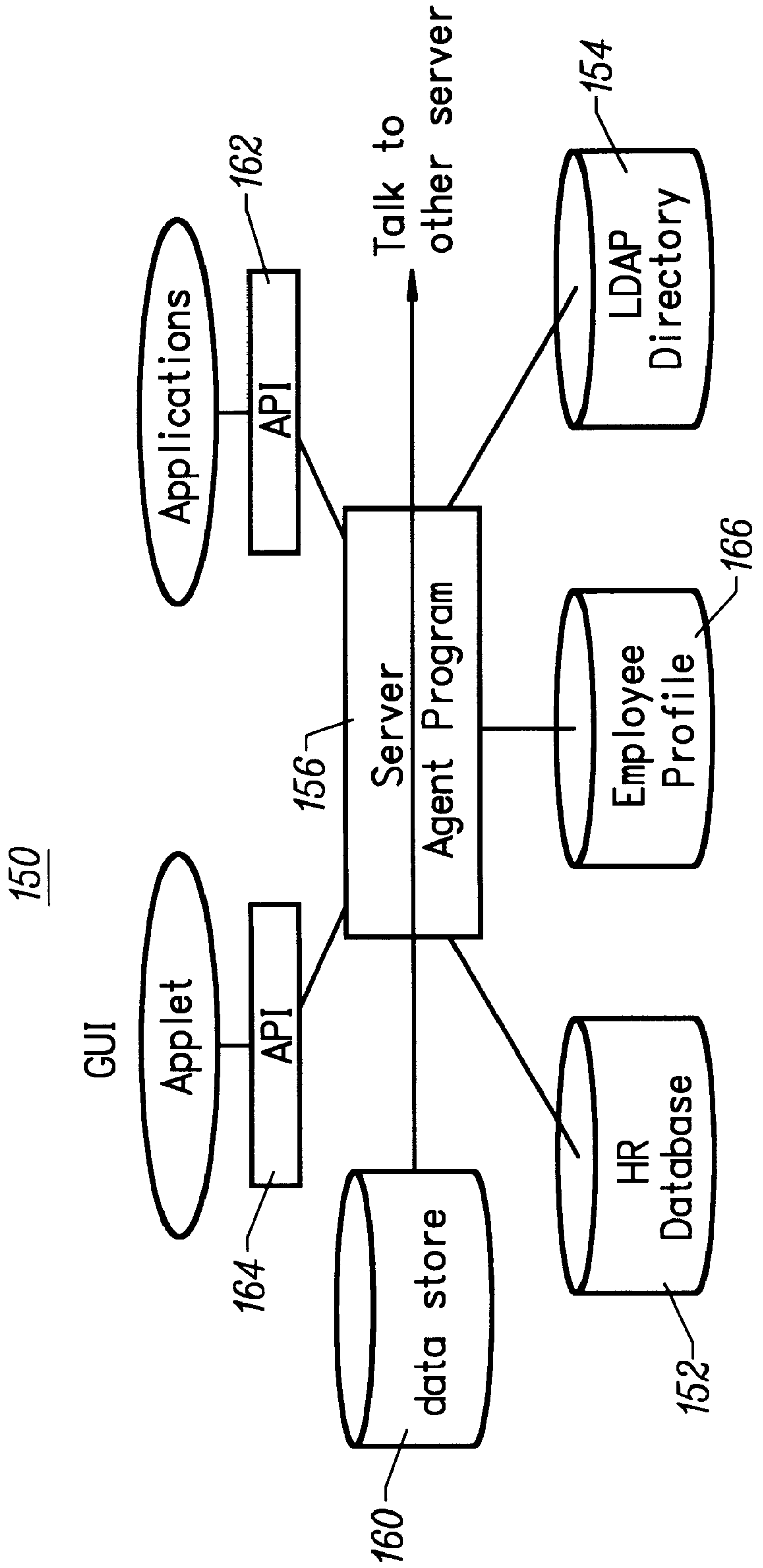
FIG. 8 illustrates the OMM runtime system architecture.

FIG. 8 illustrates the runtime system architecture 150 implementing the organizational model 50 of the present invention. Existing organizational databases, such as a human-resource (HR) database 152, a corporate directory 154, an employee profile database 166, are analyzed and mapped to the organization model 50 (FIG. 3). Based on this mapping, agent programs 156 which make up a part of a server architecture 158 can populate a data store 160 by accessing the existing databases like 152, etc. The agent programs 156 are usually standalone application programs. In some cases, due to the continual usage of legacy HR applications over the existing organizational databases, it is necessary to periodically refresh some part of the data store 160 by rerunning the agent programs 156. The user can define the agent programs 156 to run on a periodic basis to extract newer information from the existing databases into the data store 160. This keeps the data store 160 up-to-date and in the same state as existing databases like 152. Normally, each existing database like 152 has a customized agent program 156 responsible for retrieving data therefrom.

The database schema of the present invention provides for the integration of multiple databases through a mapping process and an inventive database schema. For each database to be integrated, like HR database 152 for example, an organization 52 is defined (as illustrated in FIG. 3). For each field in the HR database 152, a corresponding member 54 having an attribute 60 and/or method 62 is defined in the organization 52. Each attribute 60, such as job__code, title, address, phone, etc., has a system defined identifier: attribute__id. Each organization 52 is implemented with a number of database objects or table, in the case of a relational database. Each of the database objects is used to store the attributes 60 of a specific data type such as integer, float, character string, date, raw bitmap, etc. Each of the database objects has a group of fields, such as member__id, attribute__id, attribute__value, etc. Each group of fields in the database object stores an instance of attribute value of an object occurring in the corresponding fields defined in the existing database 152.

As a result, the existing databases like 152, having any number of fields defined, becomes a list of organizations like 52. Each organization having a well-defined database schema using database objects comprising a group of fields, i.e. member__id, attribute__id, attribute__value, etc. Any application can then be advantageously integrated with the present invention regardless of the format of the preexisting databases by using the structure provided by the inventive database schema, namely, the group of fields.

On the front-end of the system architectural 150 illustrated in FIG. 8, users access the organizational model 50 information by calling an application programming interface (API) 162. Alternatively, a graphical tool calling the API 162 can be used by users to manipulate the organizational objects through a graphical user interface (GUI) 164.

Multiple servers like 156 can be used in the architecture of the present invention. Each server 156 attends clients within a domain. The servers like 156 exchange information with one another through the regular APIs. A domain corresponds to a physical implementation of a data store like 160. Multiple organizations can reside in a domain, but an organization does not span across domains. A domain has a globally unique identifier, while organization names are unique only within a domain. However, the relatively unique name of an organization, combined with the unique domain name, must be a universally unique identifier (UUID). For example, domain london and domain seattle may both contain an organization named employee. The corresponding unique organization names will be:

employee.london employee.seattle

Similarly, although a member name is only unique within an organization, by concatenating the member name with the UUID of the organization, a UUID for the member is obtained as well. For example, the member names

| |
|---|
| john__smith.employee.london |
| john__smith.employee.seattle |

are globally unique.

For a user to be able to access the global organizational information, updates to domains and organization definitions ought to be propagated to all servers on a regular basis (such as once every hour). It is not necessary to escalate updates of members, virtual links, or attributes outside of a domain, for the organization UUID will indicate if the underlying information is managed by another server. Based on this UUID, the local server may retrieve data from the remote server.

The present invention also provides a preferred user interface for defining and manipulating organizational objects. For example, and not limitation, about 30 OMM APIs are defined in the current implementation to support organizational resource definition and manipulation. These APIs can be categorized according to the object types in Table 1:

| | Definition | Manipulation |
|---|---|---|
| Organization | create, delete | show, merge |
| Member | create, delete, copy | get, set, move |
| Attribute | create, delete, (dis)associate | show |
| Attribute Value | none | get, set |
| Virtual Link | create, delete | resolve, isLink |

The create and delete operations are responsible for the respective object definitions. The merge interface combines two organizations together. Member objects can also be created by copying the definition from another member; this produces a duplicate of a member with a new identifier. The move action puts the member object into another organization. The get operation of member supports filtering based on criteria over attribute values. Member class definition is changed through the associate and disassociate interfaces. With this design, attribute definitions can be reused in different organizations. The attribute-value get and set interfaces support manipulation of values of different data types. These set operations occur only in memory; users use the set operation of the member object to write the new values back to the data store. Finally, users may resolve a virtual link or query whether a connection exists between two objects by calling the isLink method. Detailed syntax and semantic definitions of these APIs can be found in Cheng, 1995 and 1997, see above.

Figure 9:
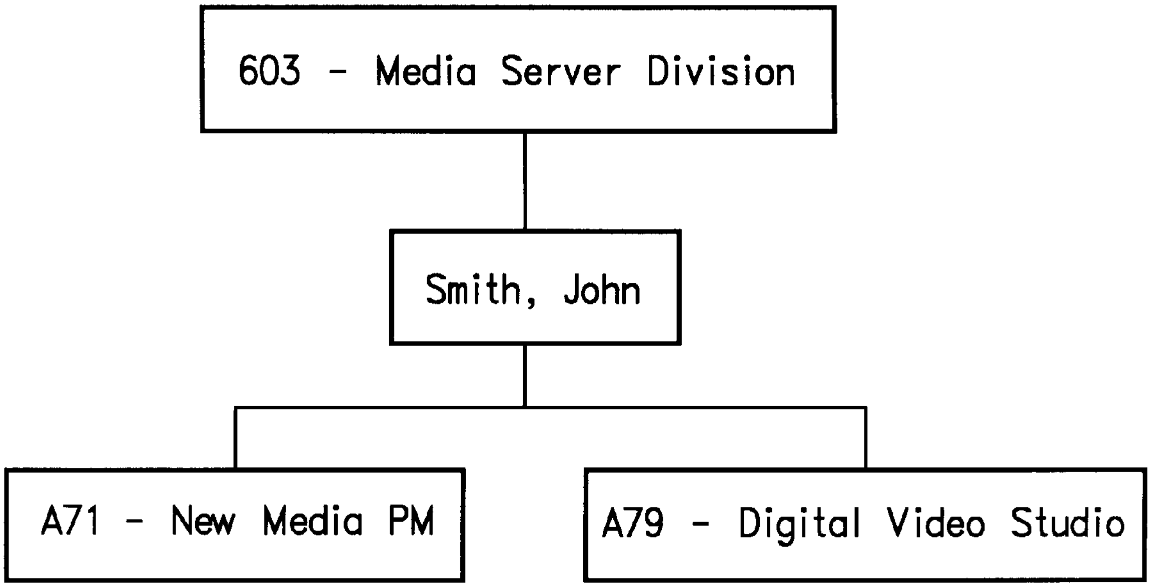
FIG. 9 is a relationship graph displayed in an OMM.
Figure 10:
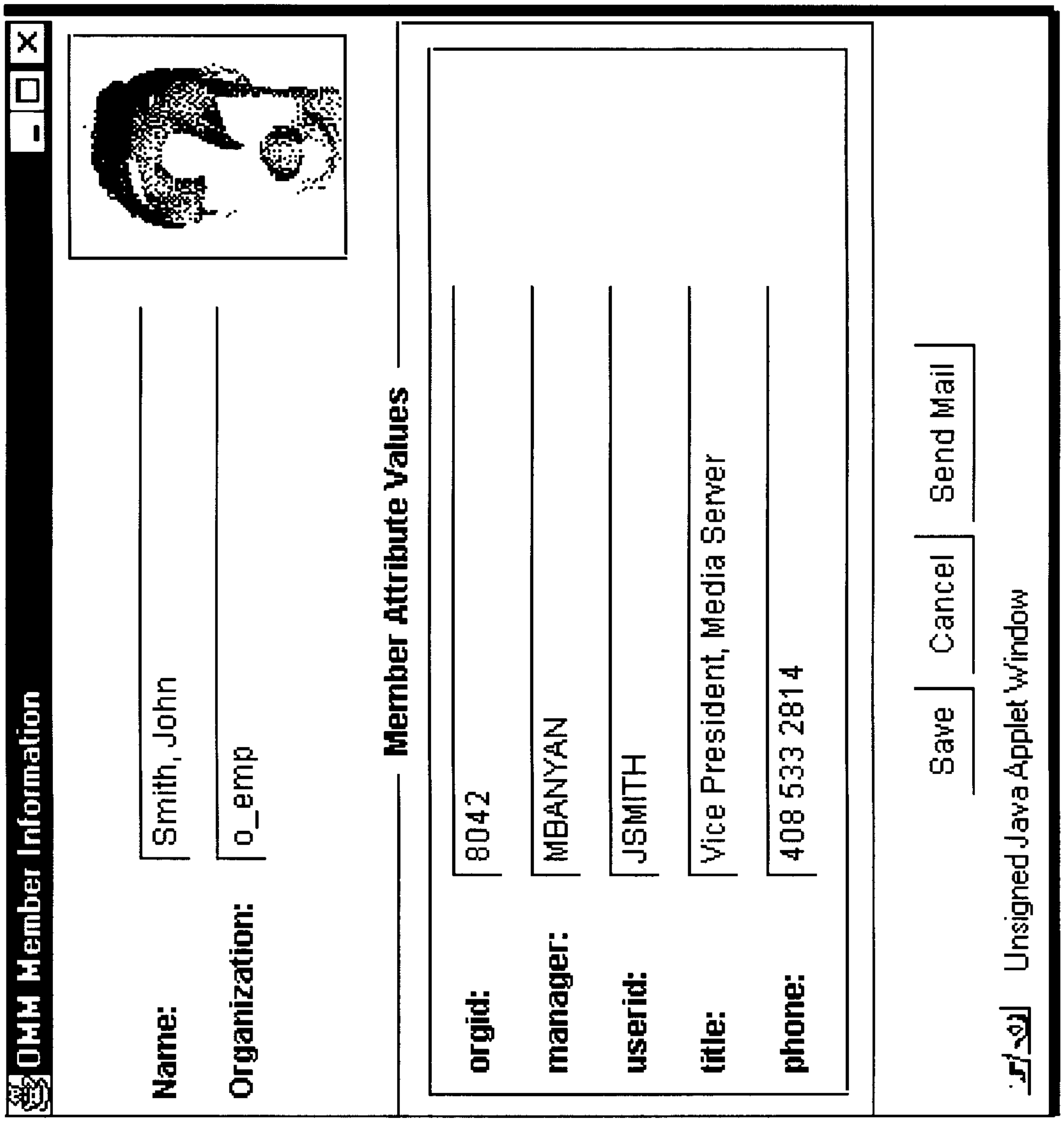
FIG. 10 is a pop-up window showing a member.

The present invention also provides a tool with a simple charting interface for displaying and manipulating organizational objects. This tool is built on top of the APIs discussed herein. FIG. 9 shows a sample relationship graph in the OMM front-end tool. Two different relationships are illustrated. The manager_of '603 - Media Server Division' is shown first on the top position. The sub_group relationship is shown at the bottom. By double-clicking on a resource box, the detailed information will be displayed through a pop-up window as illustrated for example in FIG. 10. Users view and update the member information through this window.

Another important advantage of the present invention is that the organizational model of the present invention can be easily applied in workflow systems. Workflow technology supports business process integration and automation. It provides a framework on which multiple tasks and applications are integrated to form a network of steps to accomplish a business process. From this point of view, a workflow process can be formulated as a set of nodes, representing the tasks or steps, connected by some directed edges which are condition arcs governing the flow of the process (refer to FIG. 1 for one type of representation of a workflow process). To ensure this model has a consistent flow behavior, a process always has a BEGIN and an END step. The BEGIN step only has outgoing arcs and the END step only has incoming arcs. The other steps have one or more incoming arcs and outgoing arcs.

As the process progresses in time, different tasks are created and assigned to various resources in the enterprise or organization. Sometimes a particular resource may be chosen to execute a step (the push model), other times a group of workers are identified as potential candidates to perform a task and will pick up the task at their own choice (the pull model). In both cases, authorization checking must be done when someone attempts to open and work on a workflow step.

The task assignment and task authorization, which have to do with role resolution, are among the biggest obstacles of a successful workflow solution. Role resolution refers to identifying the right resources that are playing a certain role. Two types of question are asked in role resolution. One is definitive in nature, and the other is relational. The following examples illustrate both types of question respectively:

1. Is X an engineer? Or who are the engineers? (definitive)
2. Is Y the manager of X? Or who is X's manager? (relational)

The methodology of the present invention provides a basis to model task assignment and authorization in a workflow management system. Although the syntax of assignment and authorization specifications in workflow is implementation dependent, most systems support the abstraction of roles to allow more flexibility than simply using user identifications. A control statement is usually included in the step definition for that purpose. The following syntax of control statement illustrates such a specification:

```
{... step definition ...} <Control Statement>;
<Control Statement>     ::=     <Operation>BY<Role>
<Operation>     ::=     READ|WRITE|EXECUTE|MANAGE
<Role>          ::=     <Role Label>
```

-continued

```
<Role Label>     ::=     <Character String Constant>
```

The following is an example of authorization statement within the workflow script:

```
{... step definition ...} READ BY 'Manager';
```

With the current state of the art, users are assigned to take different roles identified by a label like 'Manager'. The use of role labels has more flexibility than simply using a user name in the control statement, but still does not support resource relationships which are required in most realistic business processes such as the expense voucher process discussed in FIG. 1. With the organizational model of the present invention, the role concept is expanded to cover relationships. For example, the contextual variable can be set by the user:

```
<Role>                ::= <Role Label>|<Relationship Name>
                          <Resource>
<Relationship Name>   ::= <Character String Constant>
<Resource>            ::= <Member ID>|$INITIATOR_OF_PROCESS
```

where $INITIATOR_OF_PROCESS is a workflow system-defined data item which can be retrieved through the workflow interface. The workflow script now reads:

```
{... step definition ...} EXECUTE BY manager_of $INITIATOR_OF_PROCESS
```

At runtime, when a member M attempts to open the step for execution, the workflow engine will query the inventive organizational system to verify if M is a manager_of the initiator of the flow process. Here manager_of is a virtual link, M becomes the owner, and the initiator of that process instance is the member in question. The authorization checking therefore reduces to the question:

```
Is M the manager_of the $INITIATOR_OF_PROCESS?
```

where manager_of is defined by the expression

```
     (owner.deptNo == X.deptNo) AND (X.jobCode<101)
or
     (M.deptNo == $INITIATOR_OF_PROCESS.deptNo) AND
     ($INITIATOR_OF_PROCESS.jobCode<101)
```

Evaluation of this expression will return a boolean value of whether M is authorized to execute this step. The present invention is sufficiently flexible to coexist with prior art directory technologies have been developed with the intent to provide global infrastructure. For example, the X.500 Directory Service (see above *CCITT Recommendation X.*500 *to X*521 (1988): *Data Communication Networks, Directory*, Blue Book. Also ISO/IEC Standards ISO 9594-1 to ISO 9594-7.) supports remote directory access, centralized and distributed topologies, and centralized or distributed update methods, as well as peer-entity authentication, digital signatures, and certificates. The X.500 DS has a multiple class inheritance model and is able to describe the organizational hierarchy and capture membership information. As a directory service, X 500 and the associated protocols focus on retrieving objects with a UUID. However, X 500 and the associated protocols do not support dynamic relationships and lacks method extension. The present invention can coexist with an X.500 directory and it can also be mapped to the LDAP directory like 154 in FIG. 8 and retrieve information through the LDAP interface so that users can access and display the directory objects through the APIs.

Another example of a prior art directory technology is the Oval project by Malone and his coworkers at MIT which provides a tool for inventing (Malone, T. W., et. al., 1993, Tools for inventing organizations: Toward a handbook of organizational processes, *Proceedings of the* 2*nd IEEE Workshop on Enabling Technologies Infrastructure for Collaborative Enterprises*, Morgantown, W. Va., April; Malone, T. W., Lai, K. -Y. and Fry, C. 1995, Experiments with Oval: A Radically Tailorable Tool for Cooperative Work, *ACM Transactions on Information Systems*, 13(2):177–205. April; and *Oval Version* 1.1 *User's Guide*, 1992, Center for Cordination Science, MIT, Cambridge.). The Oval project has an object model for constructing organization information and structure. Through user-specified rules, it can process message objects such as notification or customized information flows according to a user's need. Oval also supports adding hard links between resource objects but not dynamic links.

In operation, the present invention preferably defines two types of users for the enterprise. During the process of modeling the organization, at least one of the enterprise's personnel is designated as the administrator who becomes one of the users. Higher level information such as the relationships or roles of the employees, the division or departments of the enterprise, etc. are defined by the administrator. Lower level information, such as the detailed information or profiles about the employees, is usually found in the enterprise's existing databases and is defined by the employees themselves as another type of user.

Due to rapid changes that occur in an organization, detailed information from the existing databases becomes quickly out-of-date. The employees are prompted to update their profiles using the inventive interface so that the profiles of all employees who are in some type of relationship with the employee performing the profile update automatically changes the profile of the other employees. For example, as the employee updates their profile indicating to whom they report, their manager automatically has their profile changed indicating the employee reports to them.

A user can then input a query to the present invention and determine who or what is the object(s) that satisfies the inputted expression. The present invention queries all objects to determine which objects not only fulfill the relationships of the expression, but also to determine which objects are currently active or available to respond. A list of objects (a person to whom the task can be assigned) is then generated for the user. The interactive query means of the present invention is a dynamic quality that can occur on more than one level within a group of objects. For example, not only does the present invention determine if an employee is active, but can also determine the workload status of the employee. With this determination, the task can be preferentially assigned to an employee that is idling or avoid assignment to an employee that is too busy.

The static systems of the prior art are limited to the assignment of tasks. The dynamic system of the present invention executes an expression at run-time to determine to whom the task should be assigned.

The novel features of the present invention allow it the flexibility of use in many application areas. For example, the virtual links of the present invention can be used to provide multi-level security for the system. Since dynamic roles can be defined using the virtual link expression, the system can grant access authority to the appropriate role. When access to the system is attempted, the system will query the inventive organizational management system to determine if the user is playing the authorized role. Based on the profile and contextual values, the organizational management system evaluates the rules and returns the result of whether access granted.

Another example of a specific application area of the present invention is to provide a workflow method for distributing and controlling work in a computer system. The work is defined by a procedure having a plurality of nodes with relationships defined therebetween. Each of the nodes is defined to be performed by either the computer system or by an agent. By contrast to the prior art, the agent that is assigned to perform the node is flexibly defined by a regular expression. This gives flexibility and dynamic role resolution to the workflow system. One embodiment of an inventive workflow method includes:

(a) for each time the procedure is to be performed, retrieving the procedure and defining an instance for the procedure, the instance including a plurality of nodes and connections defined therebetween, and an information packet comprising initial data for the instance;

(b) selecting a node of the instance to be performed;

(c) creating a task for the node and flexibly assigning which resource can perform the task;

(d) when the task is defined to be performed by the computer system, dynamically identifying which resource should execute the task through the OMM organization service;

(e) sending the information packet in the instance to the identified resource, and receiving results from the identified resource, whereby the identified resource performs all activities of the task defined for the node;

(f) selecting a next node connected to the node processed in steps (c) through (e) and repeating steps (c) through (e) for the selected next node, wherein a next node selected is a next node defined within the instance process after a node just performed in steps (c) through (e), unless the instance process foes not have a next node, then it is the end node; and (g) repeating step (f) until a last node of the procedure has been performed.

The present invention provides what is lacking in the relatively static workflow systems of the prior art. When the inventive workflow system generates a task, the system queries which resource or who should be allowed or assigned to do the task (task authorization and task assignment).

Having generally described the present invention, a further understanding can be obtained by reference to the following specific examples, which is provided herein for purposes of illustration only and are not intended to be limiting the present invention.

EXAMPLES

The present invention was proposed for implementation to an enterprise which comprised a global network of local chapters and a constituency of subscribing members and other supporters. The product included to support this project are: the OMM server, the OrgModel-M modeling tool, and a number of OrgManage modules to manage the various organizational types. The OrgModel-M software is a modeling tool allowing the enterprise to define various resource types used to accomplish their mission; it also allows user to model the relationships between the various resources. The OrgManage module allows accessing and managing the attribute information of different types of organizational resources. The Org Manage and OrgModel-M modules and other modules are built on top of the OMM methodology and OMM APIs the server.

A self-expanding "Internet Based Network" was created which could improve the enterprise's global operations and management by producing the following benefits: Just-In-Time and selective information for subscribers and supporters; self-expanding network initiated by subscribers and supporters as well as internal staff; increased participation in global projects; increased revenue from a larger and better informed support base; and reduced labor and equipment for database and project entries.

The organizational model of the present invention also supports global management and operations by using the Internet to increase communication, coordination, and collaboration. The present invention expands the support network and increases revenue by enhancing connectivity and relevant information dissemination with subscribers and supporters.

Implementation of the inventive organizational model to this specific enterprise was composed of three phases. The first phase focused on enhancing enterprise's operation and management by modeling the enterprise's various organizations, the associated resources, and their interdependent relationship. The server, databases, and network connectivity were set-up to run the directory and project management services at the company's headquarters site.

The second phase involved developing global and self-expanding support networks. Selected templates will be added to the Internet environment to allow users to submit project proposals and project status reports from anywhere in the world. Just-in-time information can therefore be propagated to subscribers and supporters. At this point the inventive solution can be incrementally opened up to the enterprise's worldwide operations.

The membership network becomes self-expanding through the introduction of new members by existing members. Each existing member can have a contact page created when joining the network. The contact page includes a Java-type application web page which is dynamic and have a list of personal contacts. Each contact on the list can have profile attributes such as an email address, etc. When a new contact is added to the list, the contact page queries the existing member to determine if the new contact might like to join the network. If so, the contact page generates an invitation to the new contact and sends an email to the new contact inviting them to join the network at your request. Optionally, the invitation can automatically be sent to each new contact added to the list.

The third phase focused on performance, usability, and security. In this phase, the performance and utilization of the inventive applications was reviewed, users' input was collected, and the web-hit frequency, the Individual Supporter Information Network (ISIN) and the enterprise's Network volume, and network traffic over the Internet environment was monitored. Information received is used to fine tune the implementation. As a test of security, extensive efforts were made to break into the enterprise's system.

Organization modeling to include the resource type of workers, departments, projects and tasks. The above classes of resources will be identified and defined, along with their corresponding attribute information. Dynamic relationships will be defined to represent the connections, decision making, and data flow between the different organizational objects. The model will be rich enough to represent the ontology and actual operation of the corporation.

The server and clients are installed onto the enterprise's machine(s). The objects are created and data-store populated according to the modeling result. The OrgManage Modules for People and Department are installed and the corporate directory service is deployed. An enrollment period is identified to allow users to modify their personal information (such as their address, phone numbers, titles, department, manager, project involvement, and others). Departmental and group information will be added to the database. Security levels will be set up to allow accesses only to the information that is relevant to individual users. Graphical screens will be designed for displaying and updating the various information for the inventive client operation environment. The Project & Task OrgManage Modules are added to the domain of the present invention. Project and task management screens are defined. Authorized users can add, delete and update project and task objects and status.

A typical hardware setup includes: Server: Pentium PC with 64+ MB memory, 4+ GB hard disk; running NT Server 4.0.; Clients: 486up PCs; running Windows 95 or Windows NT; Software License: OMM Server, version 2.1; OrgModel-M Applet, version 2.01; OrgManage Modules: People, Department, Project, Task; MS SQL Server 4.0 (10 user license); Oracle 7 or higher (10 user license); MS Internet Information Server 4.0 (or compatible Web/HTTP Server); Netscape Communicator 4.0 up (or equivalent Web Browsers); Network Connectivity (to support Internet access): Dedicated dial-up modem connection (preferable 56.6K); or Frame Relay (56.6K up).

Templates are added to support add, delete, update, and query of worldwide chapters. Connections between projects, project lead, project members, and supporters are established. Members can review growth, status, and photos through Internet access.

Screens are designed and exported to allow potential subscribers or supporters to sign up for "membership". The enterprise can decide to publish periodically relevant information to supporters/members at the local chapters. Members are responsible to maintain their own profiles through the Internet. They are motivated to keep the profile up-to-date because selective information are pushed to them based on their profile information. The ISIN will expand by itself and produce labor/cost savings by reducing the need for marketing, staffing, and equipment.

Screens will be designed and exported to allow new chapters to sign up to the Information Network. Contact list can be defined and be associated to a supporter's page to support the management of chapter connections. Individual members can logon to maintain their own profile with the assigned password. The membership can expand by invitation or submitting requests. Accounts and passwords are given securely to overseas operations. Restricted accesses to the database by these accounts are granted. Users can update worldwide projects and their status, and information, all through Internet access.

Another example implementing the present invention would be for a publish & subscribe enterprise. The focus of the implementation is the identification of subscribers to receive only relevant information. In this example, the enterprise is a membership network defined by the inventive model (a people organization with a list of attributes such as permanent address, sex, profession, age range, household info, habits, etc.). The membership network expands through the introduction of new members by existing members. The virtual links of the present invention are implemented to the membership base to define a criteria for the formation of "virtual communities". Examples of virtual communities are:

e.g.1: members who live in the Boston area, within age range 35–45, golf prayer e.g.2: members who have kids age 2–8, annual income>75K, and have accessed the enterprise's network more than once a week.

Selected marketing messages can then be "pushed" to users within the same virtual communities. (e.g. "A new intermediate level golf class series will be held in the Boston area." This message/product/service will be particularly interesting to the virtual community as defined in e.g. 1 above).

The dynamic organizational information system of the present invention, the underlying methodology and organization model, along with its system architecture and user interfaces are presented as a comprehensive tool to model an enterprise for collaborative computing. The present invention abstracts the organization model from the role model, thus giving flexibility in complex organization modeling. The present invention provides a unique dynamic interrelationship that is expressed by using regular expressions over member attributes and contextual variables. The relationship model is important in supporting collaborative software such as workflow, for authentication, authorization and dynamic job assignment. Using virtual links, the present invention can model dynamic roles such that policies regarding various operations over the work objects can be defined and maintained. The inventive life-cycle of the members reflects the dynamic state changes of resources in reality. This provides better support of organization management and makes dynamic task re-routing in a workflow system possible in case a resource is absent from its duty or other condition exists which prevents the resource from completing the task.

Numerous modifications and variations of the present invention are possible in light of the above teachings. It is therefore to be understood that within the scope of the appended claims, the invention may be practiced otherwise than as specifically described herein.

What is claimed is:

1. A utility for an organizational database to support collaborative computing between users within a computer system network by an enterprise having a plurality of objects, the utility comprising:

means for expressing information received from at least one of the users;

means for storing a plurality of classes of organizational objects, each class having any number of member objects;

means for mapping the member objects to the objects within the enterprise; and means for virtually linking one or more of the member objects to at least one other member object with a relationship definition which can be dynamically evaluated and resolved at runtime of the utility, the expressing means determining which of the relationship definitions to be evaluated and resolved, the expressing means coupled to the storing means, mapping means, and virtually linking means.

2. The utility of claim 1 wherein the storing means includes vertically partitioning the member objects of the enterprise and horizontally partitioning an individual member object into sub-groups.

3. The utility of claim 1 wherein one of the classes includes a main member class having attributes and methods.

4. The utility of claim 3 wherein the attributes and methods are user-defined.

5. The utility of claim 1 wherein the utility includes a life-cycle means for representing the availability of one or more member objects to function in response to the expressing means, the life-cycle means having a plurality states to indicate its availability to function, the life-cycle means changing from one state to another by input from one of the users.

6. The utility of claim 5 wherein the plurality of states includes an active state which changes to an inactive state simulating the reality of the member object being available for its function, or a removal state wherein the information of the member object is retained in the storing means, or a forgotten state wherein the information of the member object is archived.

7. The utility of claim 1 wherein the virtual linking means includes at least one relational definition between two member objects is reversible.

8. The utility of claim 1 wherein expressing means includes a graphical user interface for users to explore the relationships between resources.

9. The utility of claim 1 wherein the utility assigns a unique identifier across the enterprise.

10. The utility of claim 1 wherein the expressing means includes means for querying the relationship definition to resolve an expression received from at least one of the users.

11. A method for supplying information through an organizational database to support collaborative computing between users within a computer system network by an enterprise having a plurality of objects, the method including the steps of:

expressing information received from at least one of the users;

storing a plurality of classes of organizational objects wherein each class includes any number of member objects;

mapping member objects to an actual entity within the enterprise;

virtually linking one or more of the member objects to at least one other member object with a relationship definition; and dynamically evaluating and resolving a virtual link relationship definition at runtime of the utility, the expressing step determining which of the relationship definitions are to be evaluated and resolved.

12. The method of claim 11 wherein the utility further includes vertically partitioning a plurality of resources of the enterprise and horizontally partitioning an individual resource into sub-groups.

13. The method of claim 11 wherein one of the classes includes a main member class having attributes and methods.

14. The method of claim 13 wherein the method includes the user defining the attributes and methods.

15. The method of claim 11 wherein the method includes the step of representing the life-cycle availability of one or more member objects to function in response to the expressing step, the representing step indicating the life-cycle availability of one or more member objects to function by having a plurality states which change from one state to another by input from one of the users.

16. The method of claim 15 wherein the representing step includes the step of simulating the reality of the member object being available for its function with the plurality of states having an active state which changes to an inactive state, or a removal state wherein the information of the member object is retained in the storing step, or a forgotten state wherein the information of the member object is archived.

17. The method of claim 11 wherein the step of virtual linking includes defining at least one relational definition between two member objects as reversible.

18. The method of claim 11 wherein expressing step includes the step of exploring the relationships between resources with a graphical interface.

19. The method of claim 11 wherein the method includes the step of assigning a unique identifier across the enterprise.

20. The method of claim 11 wherein the expressing step includes the step of querying the relationship definition to resolve an expression received from at least one of the users.

21. In a computer network utilizing an organizational database to support collaborative computing between users within a computer system network by an enterprise having a plurality of objects, the network configured to:

express information received from at least one of the users;

store a plurality of classes of organizational objects with each class having any number of member objects;

map member objects to an actual entity within the enterprise;

virtually link one or more of the member objects to at least one other member object with a relationship definition;

dynamically evaluate and resolve at runtime of the network the relationship definitions determined by the express information.

22. The network of claim 21 wherein the network is configured to vertically partition the member objects of the enterprise and horizontally partition an individual member object into sub-groups.

23. The network of claim 21 wherein one of the classes includes a main member class having attributes and methods.

24. The network of claim 23 wherein the attributes and methods are user-defined.

25. The network of claim 21 wherein the network is configured to represent the life-cycle availability of one or more member objects to function in response to the expression, the life-cycle availability having a plurality states to indicate its availability to function, the life-cycle availability changing from one state to another by input from one of the users.

26. The network of claim 25 wherein the plurality of states includes an active state which changes to an inactive state simulating the reality of the member object being available for its function, or a removal state wherein the information of the member object is retained in storage, or a forgotten state wherein the information of the member object is archived.

27. The network of claim 21 wherein the network is configured to virtual link at least one relational definition between two member objects which is reversible.

28. The network of claim 21 wherein the network is configured to explore the relationships between resources using a graphic interface.

29. The network of claim 21 wherein the network is configured to assign a unique identifier across the enterprise.

30. The network of claim 21 wherein the network is configured to query the relationship definition to resolve the information received from at least one of the users.

* * * * *